March 21, 1972     G. A. CARLSON     3,650,925

RECOVERY OF METALS FROM SOLUTION

Filed June 2, 1969

INVENTOR

GORDON A. CARLSON

Chisholm & Spencer

ATTORNEYS

United States Patent Office 3,650,925
Patented Mar. 21, 1972

3,650,925
RECOVERY OF METALS FROM SOLUTION
Gordon A. Carlson, New Martinsville, W. Va., assignor to PPG Industries, Inc., Pittsburgh, Pa.
Continuation-in-part of applications Ser. No. 806,204, Mar. 11, 1969, and Ser. No. 739,741, June 25, 1968, now Patent No. 3,459,646, which is a continuation-in-part of applications Ser. No. 506,101, Nov. 2, 1965, and Ser. No. 561,999, June 30, 1966. This application June 2, 1969, Ser. No. 829,529
Int. Cl. B01k 3/04; C01d 1/40
U.S. Cl. 204—153
13 Claims

ABSTRACT OF THE DISCLOSURE

Disclosed is a method for removing metal ions from a solution containing trace amounts of the metal. The solution is passed through an electrolytic cell having a porous cathode. Metal ions from the solution are electrolytically deposited in the porous cathode as the solution passes through the porous cathode. The metal or metals are then separated from the porous cathode.

Figure 1:
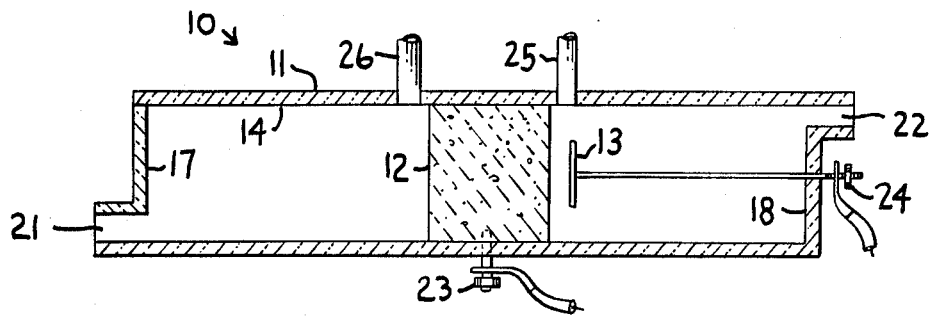

This application is a continuation-in-part of U.S. patent application Ser. No. 806,204, filed Mar. 11, 1969, and U.S. patent application 739,741, filed June 25, 1968 now Pat. No. 3,459,646, which is a continuation-in-part of U.S. patent application Ser. No. 561,999, filed June 30, 1966, now abandoned, and U.S. patent application Ser. No. 506,101, filed Nov. 2, 1965, now abandoned.

The present invention relates to an electrolytic method for recovering metals from a solution containing trace amounts of such metals.

In the past, various methods have been used for recovering metals from solutions. For example, large amounts of copper, silver, gold, nickel, cobalt, lead, antimony, bismuth, indium, mercury, and tin are produced every year using electrolytic refining and electro-winning methods. The electro-winning of copper typifies the recovery of such metals. The copper is electrolytically precipitated onto insoluble anodes such as of an antimony-lead alloy. Each of the known electro-refining and electro-winning methods necessitates the use of relatively-concentrated solutions of the particular metal. For example, in the electro-winning of copper the copper content of the solution is normally about 35 grams per liter.

The present invention provides an electrolytic method for recovering metals from solutions containing only trace amounts of such metals, for example, 1,000 to 10,000 micro grams per liter, thereby making possible the recovery from sources previously unusable. Solutions containing trace amounts of metals are readily available from various sources. For example, substantial amounts of aqueous solutions containing spent catalysts, particularly those including palladium, are available. Other sources would include spent plating baths, mining effluents, sea water (particularly in the form of concentrated desalination brines), and brine from mercury cells (particularly those using dimensionally-stable anodes such as platinum or ruthenium oxide). The trace metals may be removed from any of various types of solutions. For example, such metals may be removed from concentrated or dilute alkaline aqueous solutions such as caustic soda, acid solutions such as a hydrochloric acid solution, or aqueous salt solutions. Furthermore, any metal may be recovered which has a deposition potential under the particular conditions of electrolysis less cathodic than the potential which has been established at the cathode. The metals may be present in trace amounts such as 1,000 to 10,000 micro grams per liter and rarely less than 200 or more than 50,000 micro grams per liter. Such metals would include mercury, copper, iron, nickel, lead, vanadium, manganese, ruthenium, rhodium, palladium, osmium, iridium, platinum, gold, and silver.

In the method of the present invention, the solution is passed through an electrolytic cell having a porous cathode and the metal is deposited in the porous cathode. Any of various methods may then be used for removing the metal from the cathode. One of the simplest methods is to distill the metal, this being particularly desirable in the case of recovering mercury. Furthermore, the metal may be removed from the cathode by burning away or dissolving the cathode itself. This would be particularly applicable in the case of the rare or valuable metals such as gold, palladium ruthenium, and platinum. Also, the metal may be chlorinated by passing chlorine gas through the cathode and recovered as the metal chloride. Usually, however, the metal will be removed from the cathode by redissolving the metal as a salt in an aqueous solution in a concentrated form such as by chemical means or by reversing the cell polarity. For example, the concentration of the metal may be increased as much as 200 fold. The metal may then be recovered from the concentrated solution by any of various conventional methods such as those typically used in electroplating, electro-refining, and electro-winning. Alternatively, the metal may be recovered from the concentrated solution by any other conventional method such as precipitation or ion exchange. Generally, the original solution will contain the desired metal together with other metals. It may be desirable to selectively remove the desired metal from the solution. One may selectively remove a metal from a solution by controlling the potential of the cathode at some value relative to a standard electrode, typically a calomel or hydrogen electrode. Any metal which has a deposition potential equal to or less than that value will be deposited in the porous cathode. Metals having a deposition potential more electropositive than the desired metal will remain in solution and pass through the cell. If one wishes to remove only noble metals from the solution, the potential may be maintained at a point at which only the noble metals will be plated out and other metals more electropositive than the noble metals would pass through the cell. Moreover, the solution, if containing several metals, may be passed through a series of cells each having a cathode at a different potential. Thus, each cell would take out a different metal.

The cell 10, which may be used for carrying out the present invention, is shown in FIG. 1 and comprises a cell container or body 11, a porous cathode 12, and an anode 13. The cell 10 of the present invention may be of any desired size or shape. The cell 10 is shown as having a cell body 11 which is cylindrically shaped. The cell body 11 may be constructed of any suitable material so long as the portions thereof in contact with the solutions, that is, principally the inner surfaces, are resistant to any corrosive action of the solutions. For example, glass may be used or, alternatively, steel which is lined with rubber or plastic. The cell body 11 includes a cylindrical side wall 14 and a pair of end walls 17 and 18 each including an opening 21 and 22, respectively, for admitting or removing solution. The cell body 11 has a pair of vents 25 and 26 for removal of any product gases from the cell.

A cathode 12 is comprised of a porous electrode material which is sealed within the cell body 11 such that the solution cannot escape therearound but rather must pass through porous cathode 12. Although the cathode may be comprised of various porous materials having various degrees of porosity, preferably it is comprised of an electrically-conductive carbonaceous material, for example, graphite or carbon. Typical examples of such porous graphite and carbon are shown in Table I.

tial. The cell voltage should be 5 volts or less and the current density should be below that at which the solution itself will rapidly decompose. In any event, the cathode should be at least as cathodic as the deposition potential for the desired metal ion under the particular conditions of the electrolysis.

The flow of solution through cell 10 may be with the anode upstream of the cathode or, alternatively, with the anode downstream of the cathode. When the cell 10 is connected with the anode upstream of the cathode, the solution enters the cell through the opening 22 pass-

TABLE I

| | Weight, pounds per cu. ft. | Strength, pounds per square inch | | | Percent porosity | Average pore diameter, inches | Minimum diameter particle retained, inches | Average permeability | |
|---|---|---|---|---|---|---|---|---|---|
| | | Tensile | Compressive | Flexural | | | | Air [1], cu. ft. per sq. ft. per min. | Water [2], gal. per sq.ft. per min. |
| Porous carbon: | | | | | | | | | |
| Type A | 64 | 100 | 800 | 300 | 48 | .0047 | .0025 | 10 | 90 |
| Type B | 65 | 200 | 900 | 500 | 48 | .0023 | .0009 | 3 | 30 |
| Type C | 66 | 300 | 1,000 | 600 | 48 | .0013 | .0005 | | 10 |
| Porous graphite: | | | | | | | | | |
| Type D | 64 | 70 | 400 | 200 | 48 | .0047 | .0025 | 10 | 90 |
| Type E | 65 | 150 | 500 | 300 | 48 | .0023 | .0009 | 3 | 30 |
| Type F | 66 | 200 | 600 | 400 | 48 | .0013 | .0005 | | 10 |
| Type G | 66 | 110 | 500 | 250 | 48 | .0019 | .00079 | | 30 |

[1] Air at 70° F. with 15 percent relative humidity—2 inch water pressure—plate 1 inch thick. Air volume measured at 760 millimeters Hg pressure, 70° F.
[2] Water at 70° F.—5 pounds per square inch gauge—plate 1 inch thick.

Other materials, such as sintered metal or sponge, may be used in certain instances in place of the carbonaceous material provided such materials can withstand the conditions in the cell without decomposing and provided such materials have pores or channels of very small diameter, for example, in the range of 0.005 to .06 inch and, preferably, between 0.0010 and 0.0050 inch. For example, titanium or zirconium sponge may be used as the porous cathode and a platinum group metal may be deposited in the interstices of the sponge. The platinum group metal would provide the electrodconductive surface when the cell polarity is reversed. The cathode also should be made of a material that is resistant to conditions and materials in the cell such as the cathodic conditions during normal operation as well as withstanding the conditions that exist when the cell is out of operation. Furthermore, the cathode preferably should be capable of withstanding the anodic conditions that occur during one preferred metal recovery technique in which the polarity is reversed. The necessary thickness of the cathode may vary depending upon such things as the cathode material, cathode porosity, and the solution flow rates. However, the thickness will generally be between 0.25 and 5 inches. The cathode thickness could be as small as 1/16 inch provided the cathode is constructed of material that will provide the necessary strength and rigidity.

The anode 13 may be comprised of any electrically-conductive, stable material. The anode preferably has a low overvoltage and is resistant to corrosion and/or decomposition if the electrical current is discontinued or the polarity is reversed. The anode is preferably a non-porous, stable, electrically-conductive carbonaceous material such as carbon or graphite. The anode, however, in certain instances may be comprised of nickel, a platinum group metal, or titanium coated with a platinum group metal. As used herein, the term platinum group metals includes all the metals of the platinum group, namely, ruthenium, rhodium, palladium, osmium, iridium and platinum. Furthermore, the oxides of the platinum metals or mixtures of two or more such oxides could be used as a coating on the titanium metal.

The cathode 12 includes an electrical contact 23, and anode 13 includes an electrical contact 24 whereby the cell 10 may be connected to a source of electrical potening through the anode 13 and subsequently through the porous cathode 12. The solution leaves the cell then through opening 21. The cell 10 can be connected with the anode 13 downstream of the cathode by passing the solution into the cell through opening 21. The solution passes through the porous cathode 12 and from thence into contact with the anode 13 and out of the cell through opening 22.

Figure 2:
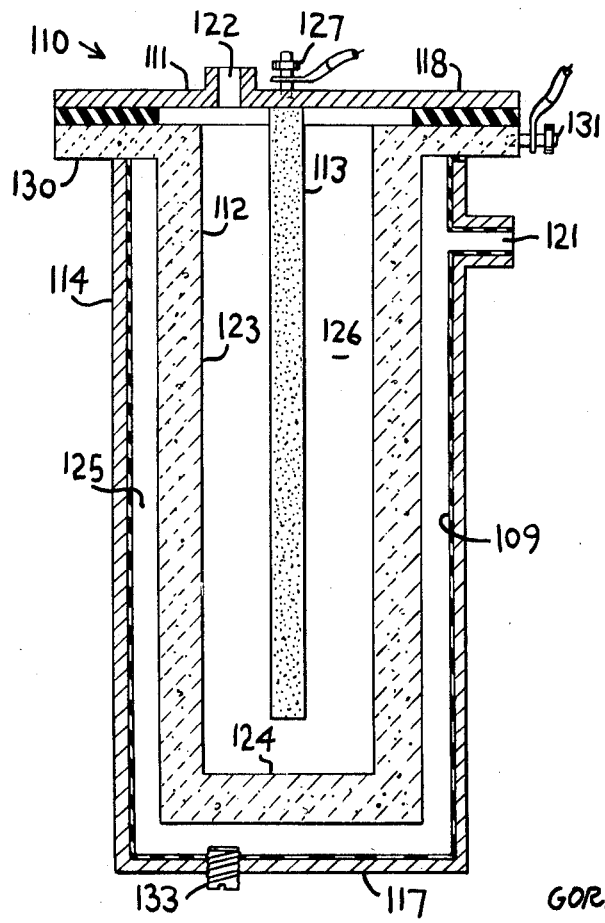

The cell 110 illustrated in FIG. 2 is another cell structure that can be used in carrying out the present invention. The cell 110 is comprised of the cell container 111, a porous cathode 112, and an anode 113. The cell container 111 may be of any material which is resistant to the solutions used such as, for example, steel having a rubber lining 109. It includes a cylindrical side wall 114, an end wall 117, and a cover 118. The side wall 114 has an opening 121 for admitting solution to the cell 110 and the cover 118 has an opening 122 for removing or admitting solution to the cell 110.

The cathode 112 may be of any suitable porous electrode material such as those described with respect to cathode 12 of cell 10. The cathode 112 of the present embodiment comprises a tube including a side wall 123 and an end wall 124. A radially-extending impervious flange 130 is provided at the upper end of cathode 112 for supporting the cathode 112 in the cell body 111. A screw 131 is mounted in flange 130 for connecting the cathode to an electrical source. The cathode 112 is suitably insulated from cover 118 and container 111. The dimensions of the cathode 112 may be selected in accordance with the rate at which solution must be treated. Furthermore, a plurality of cells connected in parallel could be used if large amounts of solution are to be treated. Also, two or more cells may be connected in series which, particularly in certain situations, may be highly desirable in that certain metals can be deposited separately in each of the cells in the series. The walls 123 and 124 of cathode 112 preferably are spaced sufficiently from the cell container 111 so as to permit a free flow of solution in the space 125.

The anode 113 may be of any material which is suitably resistant to the conditions present. The anode 113, of course, must have the necessary electroconductive properties and typically impervious graphite may be employed.

The anode 113 may be attached to the cover 118 such as by screw 127 and, if desired, may be insulated from the cover 118. The screw 127 is further used for connecting the anode 113 to an electrical source. The anode 113 is disposed concentrically within the tubular cathode 112 and, preferably, is sufficiently spaced at all points from the cathode 112 to permit unobstructed flow of solution in the space 126. A threaded plug 133 is provided in the bottom of the cell for drainage purposes.

The method of the present invention includes passing the solution containing trace amounts of metal as ions through a porous cathode cell (and thus through the porous cathode) while the cathode is under sufficient electrical potential to deposit the metal. The flow rate of solution through the cell may vary depending on such factors as the thickness of the cathode, the porosity of the cathode, and the amount of metal to be removed from the solution. It has been found satisfactory to use a flow rate of between 1 and 6 pounds of solution per square foot of cathode upstream face area when about 4,000 micro grams of mercury were being removed per liter of brine. The cell used was substantially like cell 10, having a Type E porous graphite cathode with a diameter of 2 inches and a thickness of 1 7/16 inches.

The method of the present invention further includes recovery of the metal from the cathode by any of several approaches. One highly preferred method of recovering the metal is to heat the cathode sufficiently to vaporize the metal followed by condensation of the metal. This approach is highly satisfactory for the recovery of mercury. Another preferred approach is to reverse the polarity on the cell while the cathode and anode are in contact with an electroconductive solution. The metal is thereby redeposited in solution but in a more concentrated form. For example, a solution may be recycled through the cell once or several times. Such repeated passing of solution through the cell substantially increases the metal ion concentration. For example, the metal ion concentration can be increased more than 200 or 300 times the concentration in the original solution.

The solution into which the metal is redeposited may be any concentrated or dilute electroconductive solution such as aqueous alkaline solutions, typically, caustic soda, aqueous acid solutions, typically, hydrochloric acid or aqueous salt solutions, typically, solutions of sodium chloride. The solution into which the metal is redeposited may be of a different type than that from which the metal was originally removed. For example, the metal may have been removed originally from a nitrate solution and redeposited as a chloride in a chloride solution. Thus, the metal may be recovered as a preferred salt. If desired, the electrode potential can be controlled to selectively remove particular metals from the porous cathode. The metal can then be removed from the concentrate solution by conventional methods such as electroplating on a solid cathode. A further approach to recovering of the metal is to use a combustible cathode and burn away the cathode, leaving only the metal as a residue.

EXAMPLE I

Mercury metal was recovered from a brine solution containing trace amounts of mercury ion by passing the brine through a cell substantially like cell 10. The cathode was Type E porous graphite and was 1 7/16 inches thick and 2 inches in diameter. The anode was impervious graphite of the type manufactured by Stackpole Carbon Company under the designation Grade HB 1–17 and was located downstream 3/8 of an inch from the cathode. The current density was 27.6 amperes per square foot of cathode face area. The flow rate was 3.2 pounds per minute per square foot of cathode face area. The cell temperature was maintained between 75° F. and 80° F. The cell was operated for 231 hours using brine that contained 320 grams per liter sodium chloride and 3,300 micro grams mercury per liter of solution. The product brine contained 273 micro grams of mercury per liter of solution. The total brine passed through the cell was 1,050 pounds. Thus, it was determined that 1.206 grams of mercury metal was removed from the brine. The cathode was removed from the cell and heated for one hour at 430° C. in a confined system under a total pressure of 51 millimeters of mercury, thereby vaporizing the mercury. The mercury vapor was condensed and 1.205 grams recovered.

EXAMPLE II

Mercury metal was recovered from a brine solution using the cell described in Example I. The current density was maintained between 4.5 and 27.6 amperes per square foot of cathode upstream face area. The brine flow rate through the cathode was varied between 0.7 and 5.0 pounds of brine per minute per square foot of cathode upstream face area. This variation in current density and flow rate was found not to have a significant effect on the recovery of the mercury.

The cell temperature was maintained at 80° F. The cell was operated for 143 hours and then the mercury was removed by reversing the electrical potential and passing brine through the cell for one hour, maintaining the same current density and flow rate. The feed brine contained 5,020 micro grams of mercury per liter of solution and the recovery brine contained 52,000 micro grams of mercury per liter of solution. A total of 0.91 gram of mercury was recovered.

EXAMPLE III

Mercury metal was recovered from a brine solution using the cell described in Example I. The feed brine contained 5,000 micro grams of mercury and 320 grams of sodium chloride per liter of aqueous solution. The cell was operated under the following conditions for 144 hours. The current density was 27.6 amperes per square foot of cathode downstream face area. The cell temperature was 160° F. and the flow rate was 2.8 pounds per minute per square foot of cathode downstream face area. The metals were deposited in a 5 percent hydrochloric acid solution by reversing the potential while the cell contained about 500 milliliters of the acid. The total mercury recovered from the cathode was 1.01 grams, thus providing a recovery of 88 percent based on the amount of mercury removed from the feed brine solution. The recovery solution contained 2,000,000 micro grams of mercury per liter.

EXAMPLE IV

Mercury was recovered from brine using a cell substantially like cell 110. The cell included a cathode having an outside diameter of 6 5/8 inches and an overall length of 36 inches. The wall thickness was 1 7/16 inches and the inside diameter was 3 3/4 inches. The outer face area was 5.1 square feet and the inner face area was 2.9 square feet. The cathode was comprised of Type E porous graphite (see Table I). The anode was comprised of impervious graphite rod having a diameter of 1 5/16 inches and a length of 33 1/2 inches. The impervious graphite anode was of the type manufactured by Stackpole Carbon Company under the designation Grade HB1–17. The cell body was a rubber-lined steel tube having an inside diameter of 8 inches. The cell was operated under the following conditions for 192 hours. The brine flow rate was 0.9 gallon per minute. The cell temperature was 86° F. The brine contained an average of about 2,500 micro grams of mercury per liter of solution. A total of 92.69 grams of mercury was deposited in the cathode. The electrical potential was reversed and brine saturated with chlorine was passed through the cell for 4 hours at a rate of 9.97 liters per minute. During the first 5 minutes, 23.82 grams were deposited in the chlorinated brine. During the next 5 minutes, 33.37 grams were deposited; in the next 5 minutes, 15.60 grams. During the following 15 minutes, 14.73 grams; and thereafter, only 5.17 grams were deposited in the chlorinated brine. The amount of mercury deposited in the chlorinated brine was 82 percent of the mercury contained in the original brine.

EXAMPLE V

Metals were recovered from a caustic soda solution and deposited in concentrated form in another caustic soda solution. The cell was constructed substantially like cell 10. The cathode was Type G porous graphite and was 1 inch in thickness and 2 inches in diameter. The anode was constructed of nickel screen and was located 3/8 of an inch downstream of the cathode. The current density was 27.6 amperes per square foot of cathode downstream face area. The caustic soda feed solution contained 50 percent sodium hydroxide and was passed through the cell at a flow rate of 32 grams per minute. Metals (including iron, nickel, copper, and lead) were deposited on the cathode during 66 hours of cell operation. The cell polarity was reversed and the caustic soda solution was passed through the cell for one hour. During polarity reversal, the current density was increased to 46 amperes per square foot of cathode downstream face area. The results were as follows:

TABLE II

| Metal | Concentration of feed solution (grams/liter) | Total weight in feed solution (grams) | Concentration of regenerant solution (grams/liter) | Total weight in regenerant solution |
|---|---|---|---|---|
| Iron | 0.0025 | 0.191 | 0.107 | 0.184 |
| Nickel | 0.00015 | 0.012 | 0.0021 | 0.006 |
| Copper | 0.00015 | 0.012 | 0.0133 | 0.023 |
| Lead | 0.0013 | 0.110 | 0.0645 | 0.080 |

EXAMPLE VI

Metals were recovered from a caustic soda solution and then deposited in a highly-concentrated form in a 5 percent hydrochloric acid solution. The cell was constructed substantially like cell 10 except that the cathode was of Type E graphite and was 17/16 inches in thickness. The anode was a nickel screen and was located upstream of the cathode. Caustic soda was passed through the cell for 74 hours at 170° F. The current density was 27.6 amperes per square foot of cathode upstream face area. The flow rate was 3.2 pounds caustic soda solution per minute per square foot of cathode upstream face area. The feed solution contained about 50 percent sodium hydroxide. The feed solution further included about 2,600 micro grams iron, 1,050 micro grams nickel, 100 micro grams copper, and 1,400 micro grams lead per liter of solution. The cell was maintained under electrical potential while drained and washed with water to remove caustic. The polarity was reversed and the cell was immediately filled with 450 milliliters of a 5 percent hydrochloric acid solution. A current density of 27.6 amperes per square foot of cathode upstream face area was maintained for 25 minutes. The cell was drained and rinsed with 450 milliliters of 5 percent hydrochloric acid solution. The cell was then filled with 450 milliliters of 5 percent hydrochloric acid solution and the same current density was maintained for 35 minutes. The following table illustrates the results obtained.

TABLE III

| Metal | Quantity deposited into solution during 1st 25 min. (grams) | Quantity deposited into HCl during next 35 min. (grams) | Percent deposited into solution during 1st 25 min. |
|---|---|---|---|
| Iron | 0.28 | 0.014 | 95 |
| Nickel | 0.035 | 0.0089 | 80 |
| Copper | 0.0027 | 0.00027 | 91 |
| Lead | 0.067 | 0.010 | 87 |

EXAMPLE VII

Palladium was recovered from solution using a cell constructed substantially like cell 10. The cathode was Type E porous graphite and was 17/16 inches in thickness and 2 inches in diameter. The anode was impervious graphite located 3/8 inch downstream from the cathode. The cell voltage was 1.95 volts and the cathode current density was 27.6 amperes per square foot of cathode downstream face area. The solution feed rate was 1.64 pounds per minute per square foot of cathode downstream face area. The solution contained about 192 grams sodium nitrite ($NaNO_2$), 106 grams sodium carbonate ($NaCO_3$), 43 grams sodium nitrite ($NaNO_3$), and 43 grams sodium sulfate ($NaSO_4$) per liter. The solution further included 22,000 micro grams of palladium per liter. The cell was operated for 30 hours. A total of slightly over 0.1 gram palladium was removed from solution. The palladium was removed from the cathode by circulating 1,110 milliliters of a 5 percent hydrochloric acid solution through the cell over a period of 1 hour while the cell was under reversed polarity and had a current flow of about 27.6 amperes per square foot of cathode downstream face area. The hydrochloric acid recovery solution contained 110,000 micro grams palladium per liter.

EXAMPLE VIII

Palladium was recovered from a 10 percent hydrochloric acid solution using a cell identical to the cell described in Example VII. The cell voltage was 2.2 volts and the current density was 27.6 amperes per square foot of cathode downstream face area. The solution contained 10,500 micro grams of palladium per liter and was passed through the cell at the rate of 1.69 pounds per minute per square foot of cathode downstream face area. The cell was operated for 29 hours. The solution leaving the cell contained less than 100 micro grams of palladium per liter. The palladium was removed from the cathode by passing a 10 percent hydrochloric acid solution through the cell for 1 hour while the polarity of the cell was reversed and the current density of the cathode was 27.6 amperes per square foot of cathode downstream face area. The recovery solution contained 124,000 micro grams of palladium per liter. Thus, about 0.29 grams of palladium were removed from the original solution and about 0.26 grams of palladium were removed from the cathode into the recovery solution.

EXAMPLE IX

Copper was recovered from a 20 percent hydrochloric acid solution using a cell identical to the cell described in Example VII. The cell voltage was 2.5 volts and the current density was 27.6 amperes per square foot of cathode downstream face area. The solution was passed through the cell at the rate of 1.25 pounds per minute per square foot of cathode downstream face area. The cell was operated for 47 hours. The solution entering the cell contained 2,800 micro grams of copper per liter. The solution leaving the cell contained less than 100 micro grams of copper per liter. The copper was removed from the cathode and deposited in 970 milliliters of a 10 percent hydrochloric acid solution by reversing cell polarity and applying sufficient voltage to provide a current density of 27.6 amperes per square foot of cathode downstream face area. The recovery solution picked up 90,000 micro grams of copper per liter of solution. Thus, about 0.89 grams of copper were removed from the original solution and about 0.875 grams were removed from the cathode into the recovery solution.

EXAMPLE IX

This example illustrates the effect of recycling the recovery solution through the cell. The cell was constructed identical to the cell used in Example VII. The cell was operated for 73 hours at a cell voltage of 3.3 volts and a solution flow rate of about 3 pounds per square foot of cathode downstream face area. The feed solution was an aqueous solution containing about 320 grams sodium chloride and 2,400 micro grams mercury per liter. The solution leaving the cell contained about 13 micro grams of mercury per liter. The mercury was removed from the porous cathode by reversing the cell polarity and applying a voltage of 3.3 volts and a current density of 27.6 amperes per square foot of cathode downstream face area while passing 2,760 milliliters of a recovery solution through the cell over a period of 1 hour. The brine contained 320 grams sodium chloride and picked up 33,600 micro grams mercury per liter. The cell was then used to remove mercury from a solution containing 320 grams sodium chloride and 2,800 micro grams of mercury per liter. The cell was operated for 71 hours at 3.3 volts and a feed solution flow rate of 3 pounds per minute per square foot of cathode downstream face area. The mercury was removed from the porous cathode by reversing the cell polarity and applying a voltage of 3.4 volts and a current density of 27.6 amperes per square foot of cathode downstream face area while passing the previously used recovery solution containing 33,600 micro grams mercury per liter through the cell. The recovery solution picked up an additional 118,000 micro grams of mercury per liter thus containing a total of about 151,000 micro grams of mercury per liter of solution.

Although the present invention has been described with reference to the specific details of particular embodiments thereof, it is not intended thereby to limit the scope of the invention except insofar as the specific details are recited in the appended claims.

I claim:

1. A method of recovering a metal from a solution containing trace amounts of the metal as ions, said method comprising:
   subjecting the solution to electrolysis in an electrolytic cell while passing the solution through a porous cathode of the cell, thereby depositing out the metal ion in the cathode;
   reversing the potential of the electrolytic cell and passing a solution through the cell, thereby resulting in the resolution of the metal as a salt in concentrated form; and
   removing the salt from the solution.

2. The method of claim 1 wherein the solution from which the metal is to be recovered contains at least two types of metallic ions and wherein one type of metallic ion is selectively recovered.

3. The method of claim 1 wherein the solution from which the metal is to be recovered contains between 1,000 and 10,000 micrograms per liter of trace metal.

4. The method of claim 1 wherein the recovery solution is passed through a metal containing porous cathode at least two times.

5. A method of recovering a metal from a solution containing trace amounts of the metal as ions, said method comprising:
   subjecting the solution to electrolysis in an electrolytic cell while passing the solution through a porous cathode of the cell, thereby depositing out the metal ion in the cathode;
   reversing the potential of the electrolytic cell and passing a solution through the cell, thereby resulting in the resolution of the metal as a salt in concentrated form;
   removing the salt from the solution; and
   reducing the salt to the metal.

6. The method of claim 5 wherein the solution from which the metal is to be recovered contains at least two types of metallic ions and wherein one type of metallic ion is selectively recovered.

7. The method of claim 5 wherein the solution from which the metal is to be recovered contains between 1,000 and 10,000 micrograms per liter of trace metal.

8. A method of recovering a metal from a solution containing trace amounts of the metal as ions, said method comprising:
   subjecting the solution to electrolysis in an electrolytic cell while passing the solution through a porous cathode to deposit out the metal ion in the cathode; and
   vaporizing the metal out of the cathode.

9. The method of claim 8 wherein the solution from which the metal is to be recovered contains at least two types of metallic ions and wherein one type of metallic ion is selectively recovered.

10. The method of claim 8 wherein the solution from which the metal is to be recovered contains between 1,000 and 10,000 micrograms per liter of trace metal.

11. A method of recovering a metal from a solution containing trace amounts of the metal as ions, said method comprising:
    subjecting the solution to electrolysis in an electrolytic cell while passing the solution through a porous, carbonaceous cathode of the cell to deposit out the metal ion in the cathode; and
    burning away the carbonaceous material of the cathode.

12. The method of claim 11 wherein the solution from which the metal is to be recovered contains at least two types of metallic ions and wherein one type of metallic ion is selectively recovered.

13. The method of claim 11 wherein the solution from which the metal is to be recovered contains between 1,000 and 10,000 micrograms per liter of trace metal.

References Cited

UNITED STATES PATENTS

| | | | |
|---|---|---|---|
| 1,414,423 | 5/1922 | Langer | 204—24 |
| 1,718,103 | 6/1929 | Baxter | 204—105 |
| 2,044,888 | 6/1936 | Overdick et al. | 204—153 |
| 3,061,537 | 10/1962 | Yagishita | 204—130 |
| 3,244,605 | 4/1965 | Hotchkiss | 204—153 |
| 3,324,026 | 6/1967 | Waterman et al. | 204—302 |
| 3,459,646 | 8/1969 | Carlson | 204—153 |

FOREIGN PATENTS 357,630   9/1931   Great Britain.

JOHN H. MACK, Primary Examiner

T. TUFARIELLO, Assistant Examiner

U.S. Cl. X.R.

204—284